Dec. 12, 1950

F. W. ROBERTS

HIGH-SPEED INTELLIGENCE RECORDING AND REPRODUCING SYSTEM

Filed Sept. 17, 1946

2,534,060

INVENTOR

Frederick W. Roberts

BY

Blair, Curtis + Hayward

ATTORNEYS

Patented Dec. 12, 1950 2,534,060

UNITED STATES PATENT OFFICE 2,534,060

HIGH-SPEED INTELLIGENCE RECORDING AND REPRODUCING SYSTEM

Frederick W. Roberts, Fairfield, Conn., assignor to Dictaphone Corporation, New York, N. Y., a corporation of New York Application September 17, 1946, Serial No. 697,591

8 Claims. (Cl. 179—100.1)

This invention relates to a system for the electric transmission of code signals wherein such signals are transmitted, received, and recorded at relatively high speeds, and subsequently reproduced at lower speeds; and particularly to improved sound recording and reproducing methods and apparatus for such systems whereby the reliability and speed of transmission may be increased and the readability of the signals enhanced.

In such transmission systems it is desirable to transmit code communications at high speeds in order to reduce the time required for transmission of a given message and thereby increase the usefulness of the transmitting and receiving equipment. In one system, in common use, this is accomplished by perforating a flexible tape in accordance with the code signal to be transmitted and then utilizing this tape, moving at high speed, to actuate an automatic code transmitter. At the receiving station this high-speed message is recorded on a suitable sound recording medium, as for example, a wax cylinder. After completion of the high-speed transmission the recorded message is reproduced at a speed sufficiently low to permit easy transcription.

In order to maintain the background noise at a low level, it has often been the practice to utilize a highly selective, that is, sharply tuned receiver and a peaked audio-amplifier for reception of the code signal. With such a highly selective receiver system, adjustments of the equipment are critical and slight shifts in the frequency of the transmitted signal or small variations in the receiver characteristics, such as those caused by temperature changes, may cause the signal to fade out so that no recording will be made and part of the message will be permanently lost.

The apparatus described herein overcomes this disadvantage of selective or narrow channel reception by utilizing a relatively broadly tuned receiver and amplifier. The use of such a receiving system insures recording of the entire message, regardless of changes in the frequency of transmission or receiver adjustments.

Ordinarily, the wider the receiver channel, the lower will be the level of the signal in comparison to the background noise. In earlier systems, the sharply tuned receiver was considered necessary in order to maintain the background noise at a low level, i. e., to maintain a high signal-to-noise ratio. In accordance with the present invention, this desirable effect of a sharply tuned receiver is retained by providing tuned filters in the amplifier of the reproducer unit so that the desirable results of a selective system may be achieved without the danger of permanently losing a portion of the message. Thus, the reliability of such a high speed code transmission system is substantially increased while retaining the desirable signal-to-noise characteristics of the usual selective receiving system.

In a system incorporating the present invention, an increase in the speed of code transmission necessitates a greater ratio of recording to reproducing speed; and the higher this ratio, the lower will be the frequency of the code signals to be transcribed. If this frequency is too low, transcription is difficult. The present invention overcomes this difficulty by distorting the reproduced low speed signal in such manner as to increase the readability and render it more pleasant to the ear. This makes possible the use of such high transmission speeds that under certain circumstances the frequency of the reproduced signal may be lower than that to which the human ear is normally responsive but still permits these signals to be easily transcribed because this distortion effect increases their audibility.

It is an object of this invention to permit the use of increased transmission speeds in high speed code signal communication systems by providing for the successful transcription of low speed reproduced signals, the frequency of which may be so low as to be substantially inaudible.

It is also an object of this invention to increase the reliability of code communication systems by insuring complete recording of code messages regardless of shifts in frequency of the received signal or changes in the adjustments of the receiver, and to accomplish this result without detrimentally effecting the signal-to-noise ratio of the system by the use of selective circuits in the transcribing apparatus.

Still another object of this invention is to enhance the readability of the audio signals and even to render audible, signals of substantially sub-audible frequency by distortion of the code signal in the amplifier of the reproducing apparatus.

Other objects will be in part obvious and in part pointed out hereinafter. A more complete understanding of the nature and operation of the present invention will be apparent from the following description in conjunction with the attached drawings, in which.

Figure 1:
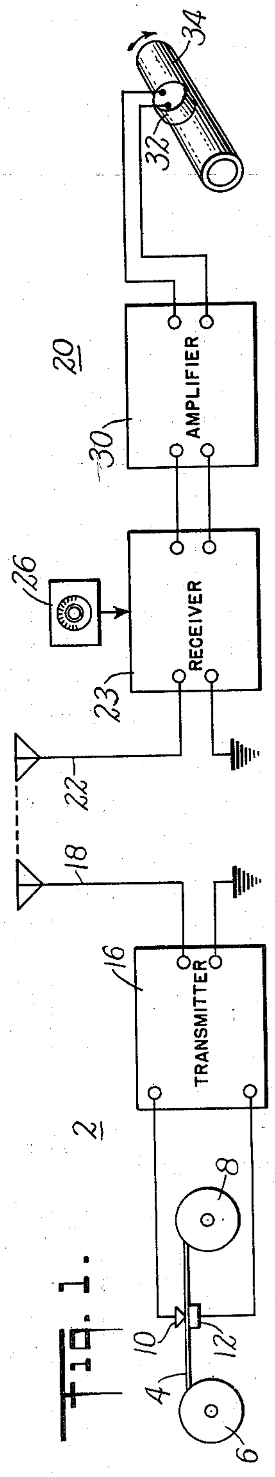
Figure 1 is a diagrammatic representation of a high speed code transmission system including a radio transmitter, a radio receiver, an audio amplifier, and a sound recorder.

Figure 1 shows a conventional type automatic high speed code transmission system consisting of a transmitter installation, generally indicated at 2, and a receiving apparatus, generaly indicated at 20. A flexible tape 4 of suitable insulating material, perforated in accordance with the message to be transmitted, moves from a supply reel 6 between a set of transmitting contact points 10 and 12 to a take-up reel 8 which is rotated at the desired transmitting speed by a suitable driving mechanism (not shown). As the tape 4 passes between the contacts 10 and 12, the electrical circuit is alternately connected and interrupted in accordance with the message to be transmitted to control the modulation of the radio transmitter 16, and thus determine the radio signals which are radiated by a transmitting antenna system 18.

The signal from the antenna 18 is received by a receiving antenna system 22 which is connected to a receiver 23. This code signal receiver 23 includes a beat frequency oscillator 26 provided with means for manually adjusting the oscillator frequency. The received signal and the signal from the beat frequency oscillator 26 are combined in the receiver 23 in the usual manner to produce an audio signal of suitable frequency for recording. This audio signal is amplified by a vacuum tube amplifier 30, having a substantially constant response over a relatively wide audio frequency band. The amplified signal is applied to a sound recorder element 32 to be recorded on a suitable recording medium, such as a wax cylinder 34, which is adapted to be rotated about its longitudinal axis as the recorder 32 is moved axially along the surface of the cylinder by a suitable driving mechanism (not shown). This sound recording equipment, for example, may be of the type shown in U. S. Patent No. 2,026,398.

Figures 2, 3:
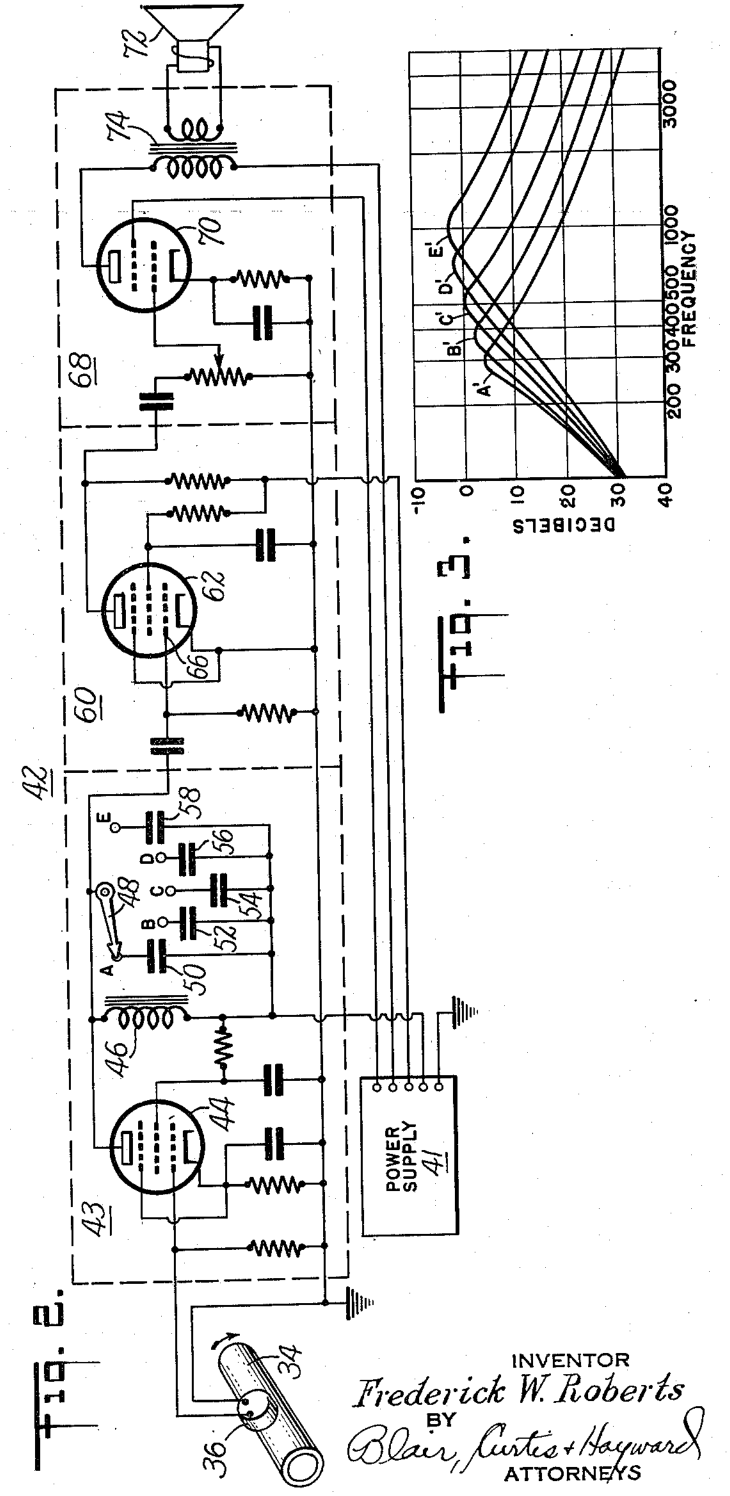
Figure 2 shows a code signal transcribing apparatus including a reproducer, an associated amplifier having filter and distortion stages, and a loudspeaker, for reproducing the signals recorded by the apparatus of Fig. 1.
Figure 3 illustrates the response curves of the amplifier filter stage shown in Figure 2.

Figure 2 represents a transcribing apparatus in which a conventional type pickup 36 is employed to reproduce the signal from the wax record 34. A driving mechanism (not shown) rotates the record at a relatively low speed about its longitudinal axis and at the same time moves the pickup 36 axially along the surface of the record. Suitable sound reproducing equipment for this purpose may be of the type shown in U. S. Patent No. 2,152,440. The signal from the reproducer is applied to an amplifier, generally indicated at 42, the operating potentials for which are derived from a conventional power supply, generally indicated at 41. The signal is first amplified by a frequency-selective voltage-amplifier stage, generally indicated at 43, including a pentode tube 44 having an inductance 46 connected in its anode circuit. A selector switch 48 is aso connected to the anode of tube 44 and is adapted to connect any one of a series of capacitors 50, 52, 54, 56, 58 in paralel with the inductance 46. The combination of this inductance with one of these capacitors forms a band-pass filter which, together with tube 44, acts as a tuned amplifier, the frequency characteristics of which are determined by the position of the selector switch 48. Representative response curves for such a tuned amplifier with various positions of the selector switch are shown in Figure 3. The curves, A', B', C', D', and E' represent the response of the amplifier stage 43 with the selector switch in the positions A, B, C, D, and E, respectively.

The output circuit of the tuned amplifier 43 is coupled to a distortion amplifier stage, generally indicated at 60, which acts to increase the audibility of the signal and make it more pleasant to the ear. In this amplifier stage, pentode tube 62 amplifies the reproduced signal and, in addition, produces an output signal rich in harmonics of the signal frequency. The circuit values are so chosen that the signal applied to control grid 66 is of sufficient amplitude to drive the tube 62, which is unbiased, to saturation on positive peaks and to cut-off on negative peaks. Severe distortion of the signal results, thus producing the desired harmonics. Such distortion of the signal may be accomplished by substitution of other various well-known devices having non-linear voltage-current characteristics such, for example, as a diode tube or commercial material having a non-linear voltage current characteristic. It is, therefore, not intended to limit this invention to the particular distortion means described herein.

The signal from the distortion amplifier stage 60 is applied to a power amplifier stage of a conventional type, generally indicated at 68, employing a tetrode tube 70, the anode circuit of which is coupled to a loudspeaker 72 through an audio transformer 74.

In the operation, the high speed code signal is combined in the receiver 23 with the signal from the beat frequency oscillator 26 to produce a signal of suitable frequency for recording. The frequency of this signal may be varied by manual adjustment of the beat frequency oscillator. The receiver and its associated amplifier 30 are designed to permit all signals appearing within a relatively wide audio channel to be recorded, thus reducing the chance that the signal will be lost because of misadjustment of the receiver or variations in its characteristics. As noted above, although this results in a lower ratio of the signal to the noise on the recording medium, it does not reduce the signal-to-noise ratio of the complete system because of the tuned amplifier employed in th reproducing apparatus. Furthermore, with this arrangement which insures against any loss of signal during recording, the reliability of the system is substantially improved.

After the message has been recorded at high speed on the record 34, this record is placed in the transcriber unit shown in Figure 2 and the message is reproduced at a lower speed suitable for transcribing. The frequency response of the tuned amplifier is adjusted for maximum signal-to-noise ratio by means of the selector switch 48 while listening to the code signal. If the operator fails to transcribe a portion of the message because of improper selection of the tuned amplifier filters or because of excessive frequency shift of the recorded signal, he can readjust the filter selector switch 48 and, by back-spacing, reproduce again that part of the message which was missed.

It has been found that a code signal having a frequency below about 200 cycles is difficult to read and transcribe, particularly if the note is a relatively pure sine wave or if high level background noise is present. The addition of harmonics to such a signal by the distortion stage increases the audibility of such a signal and thus renders it more readily transcribed and more pleasant to the ear. This is especially helpful when unusually high transmission speeds are used because the frequency of the reproduced signal may then be so low as to be substantially inaudible. By the use of the present invention, such signals may be readily transcribed after being rendered audible through the addition of harmonics, as described above.

The operation of the system may be more readily understood by consideration of a specific illustration. Assume that a code signal from the transmitting station is received at the rate of 150 words per minute and that the beat frequency oscillator is so adjusted that a signal having a frequency of about 3000 cycles per second is produced for recording. This signal is amplified by the amplifier 30 and recorded on the wax record 34 by the recording mechanism 32. If a convenient speed for transcribing is 15 words per minute, then, with a transmission speed of 150 words per minute, it is necessary to move the record past the reproducer at a speed one-tenth of that used for recording. Thus, if the recording is made on a cylinder rotating at the rate of 180 revolutions per minute, when reproducing, the record mechanism must rotate at the rate of 18 revolutions per minute. Inasmuch as there is a 10 to 1 reduction in the speed of the signal, i. e., in the number of words per minute, on reproducing; there will be a corresponding reduction in the frequency of the signal compared to the frequency when recorded. If the frequency of the signal on recording was 3000 cycles per second, with this 10 to 1 speed reduction, a 300 cycle signal will be delivered by the reproducer element. The selector switch 48 is then adjusted while listening to the reproduced signal to provide the greatest signal with the lowest background noise. Referring to Figure 3, it is apparent that the selector switch should be in position A to provide the greatest signal-to-noise ratio when the reproduced signal has a frequency of 300 cycles per second.

Certain advantages of the present invention may be more clearly understood if it is assumed, in this illustration, that the transmitting system is operating at ten times the speed suggested above, i. e., at a rate of 1500 words per minute. A speed reduction of 100 to 1 will be required to reproduce the signal at the rate of 15 words per minute. Using the same recording frequency as before, 3000 cycles per second, this 100 to 1 speed reduction will result in a 30 cycle note at the reproducer. Such a frequency is so low as to be substantially inaudible to the normal human ear. However, through the introduction of harmonics by the distortion amplifier stage 60, such a signal may be easily transcribed.

As many possible embodiments may be made of the above invention without departing from the scope thereof, it is to be understood that all matter herein set forth or shown in the accompanying drawings is to be interpreted as illustrative only and not in a limiting sense.

I claim:

1. For use in a code transmission system wherein code signals are transmitted, received and recorded at high speed and reproduced at lower speed; signal receiving and reproducing apparatus for rendering the reproduced low speed signals more readable comprising, in combination, a wide band receiver, a wide band audio frequency amplifier connected to the output of said receiver, said amplifier having a band width substantially greater than the frequency range of the audio-frequency components of said code signals including their side-bands, sound recording means connected to the output of said amplifier for making a record of the high speed signals received, means for reproducing at lower speed the recorded signals, a reproducer amplifier connected to the output of said reproducing means, wave distortion means in said reproducer amplifier for producing intense harmonics of the reproduced low speed signals passing therethrough, and means connected to the output of said reproducer amplifier for converting the amplified electrical signals and their harmonics into audible signals.

2. For use in a code transmission system wherein code signals are transmitted, received, and recorded at high speed and reproduced at lower speed; signal receiving and reproducing apparatus for rendering the reproduced low speed signals more readable comprising, in combination, a wide band receiver, a wide band audio frequency amplifier connected to the output of said receiver, said amplifier having a band width substantially greater than the frequency range of the audio-frequency components of said code signals including their side-bands, sound recording means connected to the output of said amplifier for making a record of the high speed signals received, means for reproducing at lower speed the recorded signals, a reproducer amplifier connected to the output of said reproducing means, manually adjustable band-pass filter means in said reproducer amplifier for filtering said reproduced signals, and means connected to the output of said reproducer amplifier for converting the amplified and filtered low speed electrical signals into audible signals.

3. For use in a code transmission system wherein code signals are transmitted, received, and recorded at high speed and reproduced at lower speed; signal receiving and reproducing apparatus for rendering the reproduced low speed signals more readable comprising, in combination, a wide band receiver, a wide band audio frequency amplifier connected to the output of said receiver, sound recording means connected to the output of said amplifier for making a record of the high speed signals received, means for reproducing at lower speed the received signals, a reproducer amplifier connected to the output of said reproducing means, a band-pass filter associated with said reproducer amplifier for filtering the reproduced signals, wave distortion means in said amplifier for producing intense harmonics of the reproduced signals passing therethrough, said harmonics having an energy content at least equal to that of the fundamental remaining after said distortion, and means to render the reproduced signals audible.

4. For use in a code transmission system wherein code signals are transmitted, received, and recorded at high speed and reproduced at low speed; sound channel apparatus comprising, in combination, a sound reproducer element, an audio frequency amplifier connected to the output of the said reproducer element, band-pass filter means associated with said amplifier for separating the reproduced code signals from other undesired signals, wave distortion means in said amplifier for so distorting said reproduced code signals that at least one-half the energy thereof is converted into higher frequency harmonics, and means connected to the output of said audio amplifier for converting the electrical signals into audible signals.

5. For use in a code transmission system wherein code signals are transmitted, received, and recorded at high speed and reproduced at low speed; sound channel apparatus comprising, in combination, a sound reproducer element, a multi-element vacuum tube connected to the output of said reproducer element, an inductance connected in series with the anode of said vacuum tube, a plurality of fixed value condensers, a selector switch connected to said condensers and adapted to connect one or another of said condensers in parallel with said inductance in response to manual adjustment of said switch, a major distortion stage including a multi-element vacuum tube so operated as to provide a markedly nonlinear voltage-current characteristic for so distorting the component frequencies of said code signals as to introduce harmonic frequencies of amplitude comparable to that of the fundamental frequencies remaining after such distortion, a vacuum tube power amplifier stage coupled to said distortion stage, and a loud-speaker connected to the output of said power amplifier stage.

6. A method of code reception for use in a transmission system wherein code signals are transmitted, received, and recorded at high speed and reproduced at lower speed, including the steps of, receiving a high speed code signal, amplifying audio frequency components of said signal, recording said amplified signal, reproducing said recorded signal at a lower speed, amplifying said reproduced signal, distorting said signal by generating intense harmonics thereof of such magnitude that the readability of the code signals is increased materially, and converting said electrical signal into an audible signal.

7. A method of code reception for use in a transmission system wherein code signals are transmitted, received, and recorded at high speed and reproduced at lower speed, comprising the following steps, receiving the high speed code signal, amplifying audio frequency components of said signal, recording said amplified signal, reproducing said recorded signal at a lower speed, amplifying said reproduced signal, filtering said amplified signal, manually adjusting the filter pass-band in such manner that the ratio of the signal to background noise is substantially increased, and converting the electrical signal into an audible signal.

8. A method of code reception for use in a transmission system wherein code signals are transmitted, received, and recorded at high speed and reproduced at lower speed, comprising the following steps, receiving the high speed code signal, amplifying audio frequency components of said signal, recording said amplified signal, reproducing said recorded signal at a lower speed, filtering said signal in such manner that the ratio of the signal to background noise is substantially increased, distorting said signal to a marked degree by generating harmonics thereof having such magnitude as to render readable code signals otherwise unreadable, and converting said electrical signal into an audible signal.

FREDERICK W. ROBERTS.

REFERENCES CITED

The following references are of record in the file of this patent:

UNITED STATES PATENTS

| Number | Name | Date |
|---|---|---|
| 1,514,735 | Scriven | Nov. 11, 1924 |
| 1,518,655 | Carlson | Dec. 2, 1924 |
| 1,794,664 | Balsey | Mar. 3, 1931 |
| 1,813,908 | Bethenod | July 14, 1931 |
| 1,851,905 | Hayes | Mar. 29, 1932 |
| 2,253,832 | Whitaker | Aug. 26, 1941 |
| 2,254,211 | Curtis | Sept. 2, 1941 |
| 2,306,687 | Cox | Dec. 29, 1942 |